(12) United States Patent
Pham et al.

(10) Patent No.: US 12,011,796 B2
(45) Date of Patent: Jun. 18, 2024

(54) TIMEPIECE FITTING

(71) Applicant: ETA SA MANUFACTURE HORLOGÈRE SUISSE, Grenchen (CH)

(72) Inventors: Patric Pham, Utzenstorf (CH); Joël Röthlisberger, Grenchen (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 208 days.

(21) Appl. No.: 17/685,879

(22) Filed: Mar. 3, 2022

(65) Prior Publication Data
US 2022/0339748 A1    Oct. 27, 2022

(30) Foreign Application Priority Data

Apr. 26, 2021   (EP) ..................... 21170438

(51) Int. Cl.
*B23Q 3/06*   (2006.01)
*G04D 1/06*   (2006.01)

(52) U.S. Cl.
CPC ............ *B23Q 3/062* (2013.01); *G04D 1/06* (2013.01); *B23Q 2703/10* (2013.01)

(58) Field of Classification Search
CPC ............ B23Q 3/062; B23Q 2703/10; B23Q 2240/002; G04D 1/06; G04D 1/0021; G04D 3/0053; G04D 3/0002; G04D 1/00; G04D 1/0078; G04D 1/0092; G04B 29/027
See application file for complete search history.

(56) References Cited

U.S. PATENT DOCUMENTS

| | | | | |
|---|---|---|---|---|
| 7,163,364 B2* | 1/2007 | Foscan | ............ | B23C 3/355 76/110 |
| 9,199,319 B2* | 12/2015 | Rebuli | .............. | B23C 3/35 |
| 10,953,504 B2* | 3/2021 | Schumacher | ...... | A61C 13/0022 |
| 2006/0062644 A1* | 3/2006 | Foscan | ............ | B23C 3/355 409/81 |

FOREIGN PATENT DOCUMENTS

CN          101048252 A       10/2007

OTHER PUBLICATIONS

European Search Report for 21 17 0438 dated, Sep. 17, 2021.

* cited by examiner

*Primary Examiner* — Bayan Salone
(74) *Attorney, Agent, or Firm* — Sughrue Mion, PLLC

(57) ABSTRACT

A fitting (20) for holding a flat component (1), including radial support stops (2; 3), and a chamber (40) bordered by jaws (21; 22) including clamping surfaces (310; 320) for holding the component (1), open on one side by a recess (41; 42) to perform an operation on the component (1), this fitting (20) is deformable between an open position and a closed position around the component (1) tightened by said jaws (21; 22) subjected to a closing force exerted by manoeuvring means arranged to bring these jaws (21; 22) closer to each other.

18 Claims, 4 Drawing Sheets

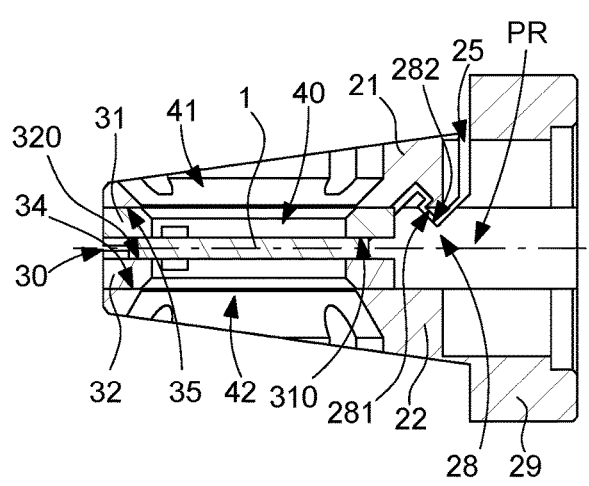
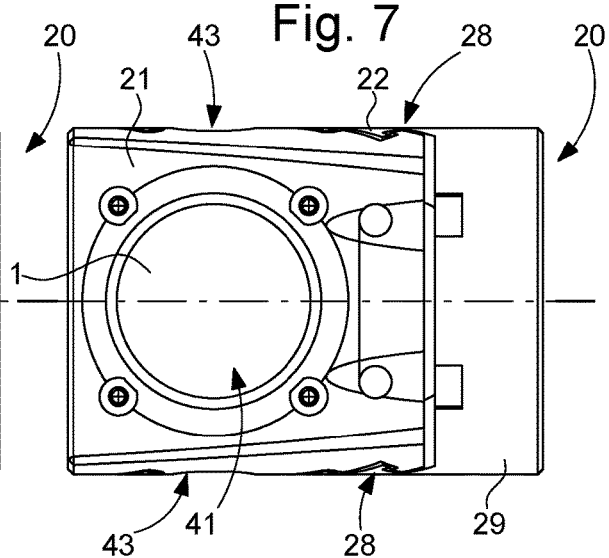
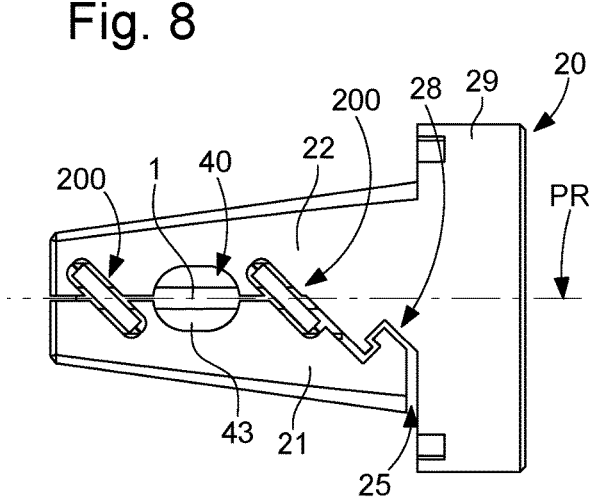
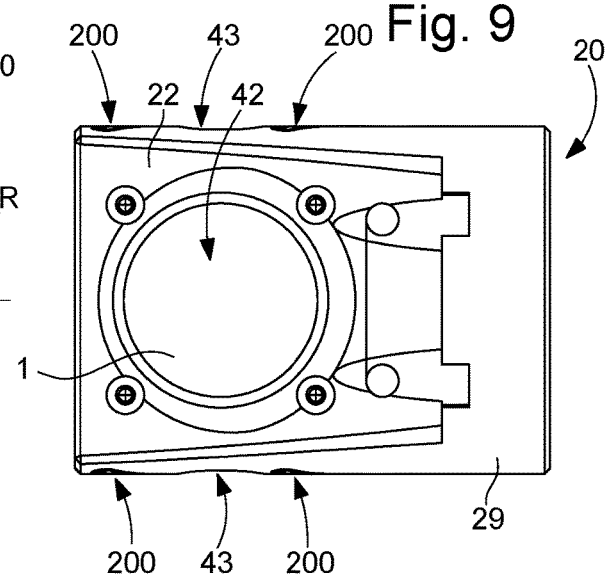
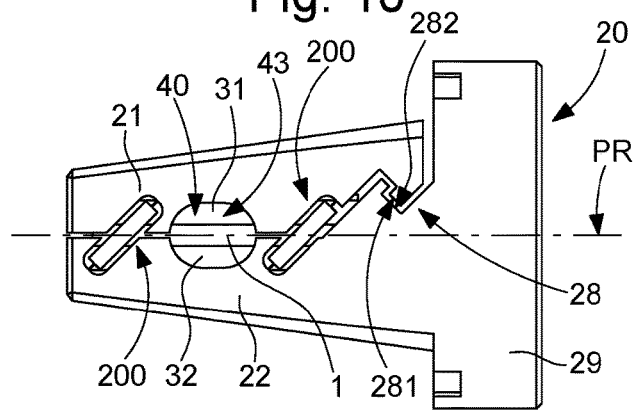

TIMEPIECE FITTING

CROSS-REFERENCE TO RELATED APPLICATIONS

This application claims priority to European Patent Application No. 21170438.2 filed Apr. 26, 2021, the entire contents of which are incorporated herein by reference.

TECHNICAL FIELD OF THE INVENTION

The invention relates to a fitting for holding, in the machining and/or assembly position, a substantially flat component with a thickness less than or equal to a predetermined maximum thickness and extending on either side of a median plane.

The invention also relates to production means including a machining and/or assembly device carrying such a fitting.

The invention relates to the field of the manufacturing tooling for micromechanics, in particular for watchmaking.

TECHNOLOGICAL BACKGROUND

In the related art, with regard to the production of horological movement-blanks, the referencing of the component to be machined is guaranteed by pins (fitting side) which will be housed in holes (part side). This requires, when loading and unloading the parts, a vertical insertion movement, in the axis of the pins. The component is held according to point supports by quite large blank-presses, which are movable clamps coming into local support on some surfaces of the component, and likely to induce deformations of the latter in the case of an excessive support force.

In order to allow this vertical insertion, the blank-presses must be released. This is often achieved through a 90° rotation of each of the rotatably mounted blank-presses. This rotation is generated through a cam coupled to the vertical movement of the blank-presses. Thus, the vertical movement of the blank-presses is of a relatively large amplitude, because it combines two distinct movements: a vertical tightening movement portion, and a rotary vertical combined movement portion to cause the blank-presses to pivot.

This large travel makes it impossible to use flexible hinge technology, because of the limited travels in this type of technology. These fittings of the related art cannot therefore be formed in one piece, they are often composed of many parts which slide into each other, giving them a certain operation clearance and thus necessarily a rigidity and reduced accuracy. The large travels, the large number of parts and the operations required for assembling the whole make these fittings relatively bulky, complex, heavy and expensive. The constitution of sets of several fittings on the same pallet or the same support is, therefore, hampered by the same considerations.

This also results in very limited access for machining, often only one face is accessible, and even in a restrained manner. For a double-sided machining, it is then necessary to perform a disassembly of the component, a reversal, and a new positioning and blocking operation prior to machining the other face.

SUMMARY OF THE INVENTION

The invention proposes to develop a fitting to improve the machining accuracy of the components, through a simpler process, in a single step.

The fittings of the prior art are often bulky, heavy, complex and expensive.

The invention also implements a one-piece fitting, which allows improving the performance of the fitting (rigidity, accuracy), to reduce the complexity and the weight, making it more capable of fulfilling the conditions for very high speed machining (HSM) and/or for miniaturizing in the trend of micromachines/"microfactories".

To this end, the invention relates to a fitting for holding in the machining and/or assembly position a substantially flat component of a thickness less than or equal to a predetermined maximum thickness and extending on either side of a median plane, according to claim 1.

The invention also relates to production means, including at least one machining and/or assembly device carrying such a fitting and such a driver to control a movement of the fitting between its open and closed positions, according to claim 18.

BRIEF DESCRIPTION OF FIGURES

The aims, advantages and features of the invention will appear better in the following detailed description, with reference to the appended drawings, where:

FIG. 6 represents, schematically and in section, the fitting of FIGS. 3 to 5, in a variant which includes holding inserts between the jaws and the blank; the jaw fastened to the machine is in the lower portion, the upper jaw is movable parallel to the previous one; including abutment surfaces which ensure a travel limitation;

FIG. 7 represents, schematically and in top view, from the side of the upper jaw, the fitting of FIGS. 3 to 6;

FIG. 8 represents, schematically and in side view, the fitting of FIGS. 3 to 7; the upper jaw is at the bottom of the Figure;

FIG. 9 represents, schematically and in bottom view, from the side of the lower jaw, the fitting of FIGS. 3 to 8;

FIG. 10 represents, schematically and in side view, the fitting of FIGS. 3 to 9; the lower jaw is at the bottom of the Figure;

DETAILED DESCRIPTION OF THE INVENTION

The invention relates to a fitting/tightening for machining and/or assembly for flat/thin parts (of the horological movement-blank type), allowing an access to all faces of such a component. In the remainder of the disclosure, only the term "fitting" will be adopted to define the device according to the invention, studied for holding a component during a machining and/or assembly operation. The term "machining" means herein, very broadly, any operation performed on a component, in particular and without limitation machining with a cutting tool, laser, water jet, plasma, or similar, or else a heat or surface treatment, screen printing, painting, or other; the term "assembly" means in the same manner any operation of joining components, such as driving, heading, brazing, soldering, gluing, or the like.

Figure 11:
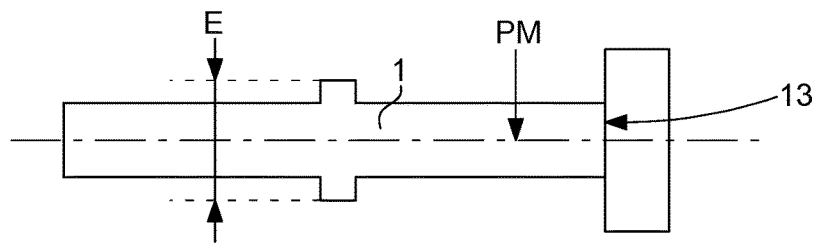
FIG. 11 represents, schematically and in section, the blank and its maximum space requirement in thickness.
Figure 12:
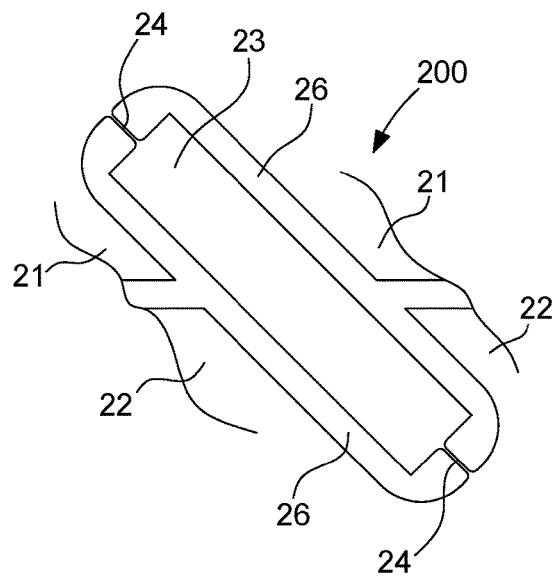
FIG. 12 represents, schematically, a detail of a flexible hinge.

The invention is designed mainly for substantially flat components 1 (also called flats), of thickness less than or equal to a predetermined maximum thickness E and extending on either side of a median plane (PM); the movement-blank of such a component 1 is not necessarily symmetrical, and may include protruding or re-entrant reliefs, as shown in FIG. 11, subject to respecting the maximum thickness dimension E, like a coin to be inserted into a coin tester.

More particularly, in a particularly advantageous embodiment, this fitting is formed in one piece with flexible hinges.

Figure 1:
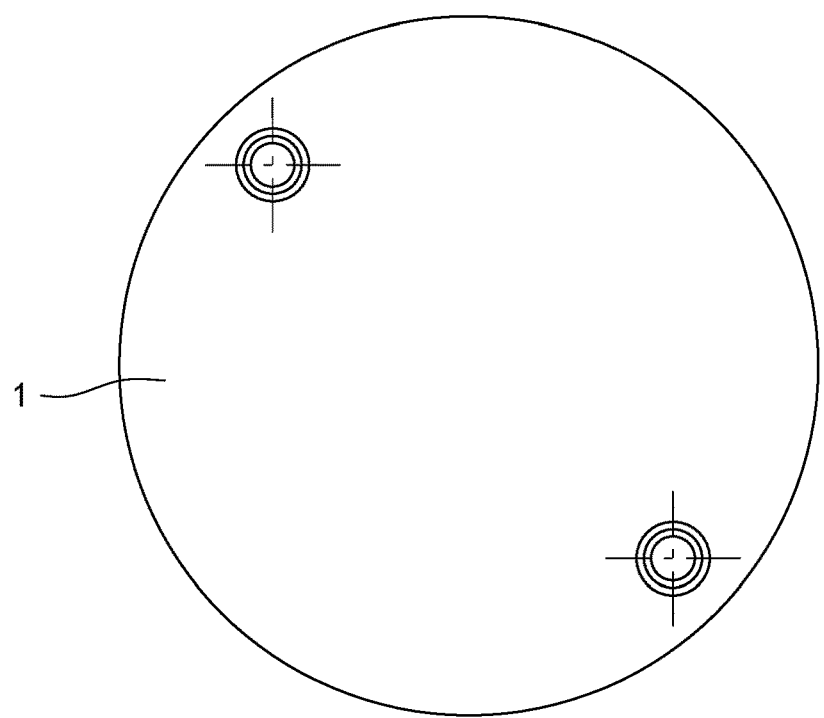
FIG. 1 represents, schematically and in plan view, the usual centering of a blank by pins, in micromechanics, this blank being held frontally by clamps called blank-presses, not represented herein, and which strongly encroach on the machining field.
Figure 2:
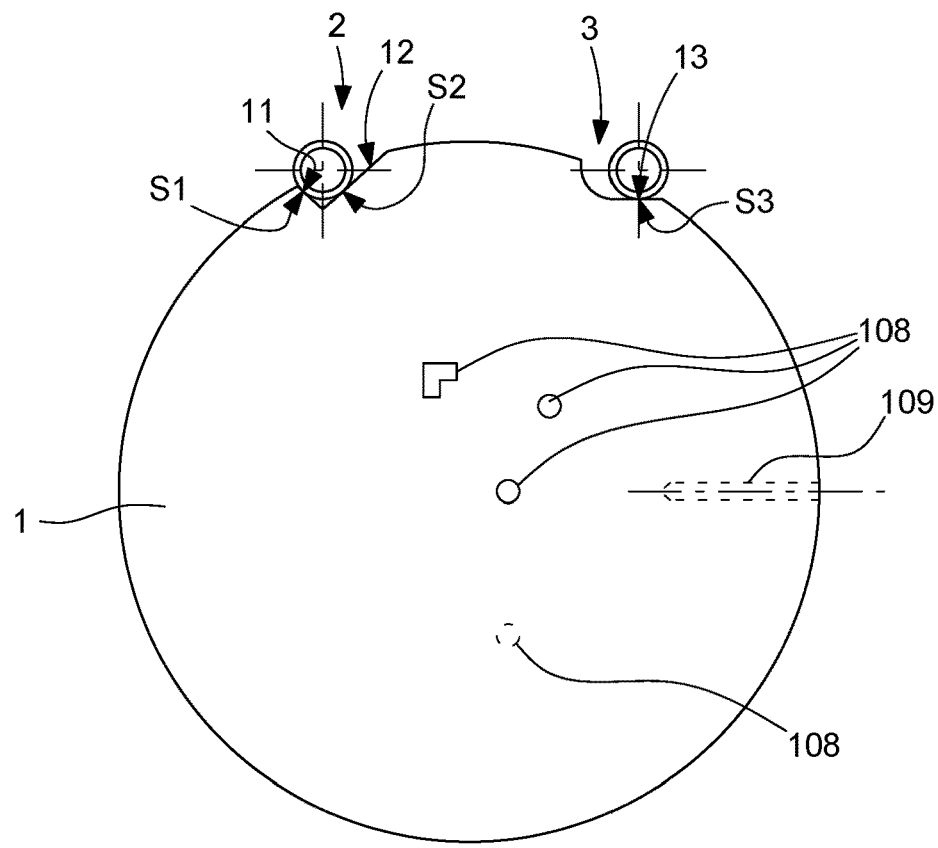
FIG. 2 represents, similarly to FIG. 1, the positioning mode specific to the implementation of the invention, with a radial support of the blank on stops located outside the machining field; some frontal and radial machining to be performed are represented on this blank.

FIGS. 1 and 2 highlight the difference between the prior art and the invention.

FIG. 1 schematises the vertical insertion of a component on two pins, in the usual prior art. This is a conventional tightening, with a vertical insertion of the component 1. In this conventional referencing, pins are inserted vertically (perpendicular to the drawing plane) into holes, or conversely. In order to allow the insertion of the component 1, on the fitting thereof, several blank-presses (often four) distributed over the surface of the component must rise and pivot in order to release access for the installation of a component 1, then to its release at the end of the operation. This generally involves a tightening travel of the blank-presses of several millimetres or even centimetres, because the rotation of the blank-presses is carried out through a cam which converts the vertical movement into rotation (typically 90°).

FIG. 2 illustrates the clamping mode proposed during the implementation of the invention, with an insertion of the component 1 horizontally, to an abutment support. This type of insertion requires a fitting 20 of a particular type, object of the invention.

According to the invention, this fitting 20 includes stops 2, 3, which define at least two radial abutment support surfaces S1, S2, S3, including generators which are substantially perpendicular to a reference plane PR of the fitting 20, and which are arranged to cooperate in abutment support with peripheral edge support surfaces 11; 12; 13 of a component 1.

Of course, the chosen clamping depends on the type of movement-blank prior to the operation, and on the peripheral machining operations which can be performed during a dispensing, stamping operation, or even a machining operation, before the operation to be performed on the fitting 20: it is quite clear that the number, shape and position of the contact surfaces depend on this particular movement-blank geometry. For example, the component 1 may include two surfaces defining a V, coming into cooperation with two complementary abutment surfaces defining a complementary V. The non-limiting variant illustrated by FIG. 2 relates to an isostatic referencing with three contact points, allowing a horizontal insertion into the plane of the Figure: a first stop 2 cooperates in support with a first notch of the component 1 which includes two surfaces 11 and 12, on which two radial abutment support surfaces S1, S2 abut; a second stop 3 cooperates in support with a recess of the component 1 which includes a flat surface 13, on which a radial abutment support surface S3 is supported. In a particular and non-limiting manner, and as shown in the illustrated embodiment, these radial notches can be obtained either by stamping or by prior machining of the component 1.

The fitting 20 is arranged so that the median plane PM of a component 1 is parallel or coincident with the reference plane PR, in the machining and/or assembly position.

Thanks to the horizontal insertion, the tightening travel, which is performed on the thickness of the component 1, can be very low, in the range of a few tenths of a millimetre, and this can be advantageously achieved with flexible joints.

According to the invention, the fitting 20 includes a chamber 40 which is bordered, on either side of the reference plane PR, by jaws 21 and 22, which include clamping surfaces 310; 320, for holding a component 1. Advantageously, these clamping surfaces 310, 320 are substantially annular, so as to evenly distribute the tightening force on the component 1, and to prevent any harmful deformation.

The chamber 40 is open, on at least one side of the reference plane PR, by at least one recess 41, 42, 43; this recess 41 or 42 or 43 is capable of enabling the passage of a tool or of another component or of a machining and/or assembly means to perform an operation on a component 1. Advantageously the fitting 20 includes two recesses 41 and 42, one on each side, on either side of the reference plane PR, it is thus possible to perform operations on both sides of the same component 1, for example and without limitation frontal machining 108 as shown in FIG. 2, in a single tightening, simply by controlling a rotation of the fitting 20. The embodiment illustrated in the Figures also includes lateral recesses 43, which have the advantage of enabling machining on the edge of component 1, such as the machining 109 of FIG. 2, for example the housing of a control rod or a push-piece on a watch plate.

The fitting 20 includes a single insertion orifice 30, which is capable of enabling the insertion of a component 1 into the chamber 40 towards the radial abutment support surfaces S1, S2, S3, of the fitting 20, in a one-way direction.

The fitting 20 is deformable between, on the one hand an open position and on the other hand a closed position. The figures illustrate a non-limiting embodiment in which each of the jaws 21, 22 includes a reference surface respectively 35, 34, parallel to the reference plane PR of the fitting 20, and, in a preferred kinematics, these two reference surfaces 35 and 34 remain parallel to each other during the closing and opening manoeuvres.

In the open position, the insertion orifice 30 has a maximum opening of width equal to the predetermined maximum thickness E, in the direction of the thickness of a component 1 on either side of the median plane PM thereof. In this open position, a component 1 can be inserted into the chamber 40 to the abutment support position on the radial abutment support surfaces S1, S2, S3.

In the closed position, the fitting 20 is deformed around a component 1 held supported on the radial abutment support surfaces S1, S2, S3, and tightened over its thickness by the jaws 21, 22, subjected to a closing force exerted by manoeuvring means arranged to bring the jaws 21, 22 closer to each other.

In the illustrated advantageous example, one of the jaws 21 is movable relative to the other jaw 22 which is fastened to the production means. Of course, each of the jaws can also be movable relative to a fixed structure, but this makes the mechanism more expensive and increases its space requirement.

Advantageously, the movement of passage from the open position to the closed position tends to reinforce the support of the component 1 on the abutment supports thereof.

In a variant, at least one of the jaws 21, 22 includes friction means which are arranged to tend to drive a component 1 in abutment support on the radial abutment support surfaces S1, S2, S3, during the closing manoeuvre.

The fitting 20 includes means allowing printing a skewed relative travel of the jaws 21 and 22 relative to each other, while maintaining the parallelism between the reference surfaces 35 and 34.

It is understood that the design of the fitting 20 enables the gripping and the tightening for holding the components 1 of different morphologies, provided that their thickness is less than the maximum thickness E, and that their holding by the clamping surfaces 310, 320, remains possible; in this regard, the figures illustrate a particular embodiment in which the clamping surfaces 310, 320 form part of removable inserts 31 and 32 which together define the insertion orifice 30. Naturally the mounting 20 can also include clamping surfaces 310, 320 directly at the jaws 21, 22. The use of removable inserts 31, 32, brings versatility to the fitting, allows supporting different dimensions and geometries of movement-blanks, and also allows a good maintenance with the guarantee of always net contact surfaces. However, the fitting 20 is designed to also operate without such inserts.

The fitting 20 can be carried out in different manners, in particular with a conventional, but expensive, hinged manufacture.

In the spirit of simultaneous machining of a plurality of components, for example in set on a pallet, it is advantageous to minimise the cost of manufacturing cost of such fittings, which can then be dedicated to a family of components.

FIGS. 3 to 10 illustrate an advantageous, non-limiting embodiment, in which, with the exception of the removable inserts presented above, the fitting 20 is formed in one piece.

Figure 3:
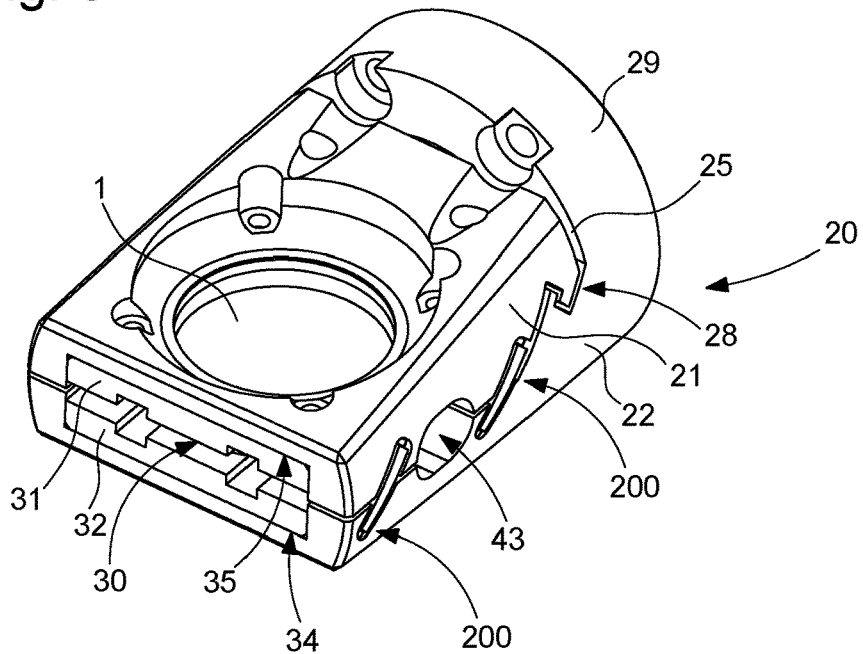
FIG. 3 represents, schematically and in perspective, a fitting according to the invention, including two jaws, one of which is intended to be fastened on a machine, and the other of which is movable relative to the first jaw; an insertion slot between these jaws allows the insertion of a blank to the stops illustrated in FIG. 2, not visible herein; it is shown on the sides of the fitting of the flexible hinges with elastic blades, constituting a parallel table system between the two jaws, and whose small space requirement mallows forming wide recesses for machining: in the example illustrated above and below, and on the sides.
Figure 4:
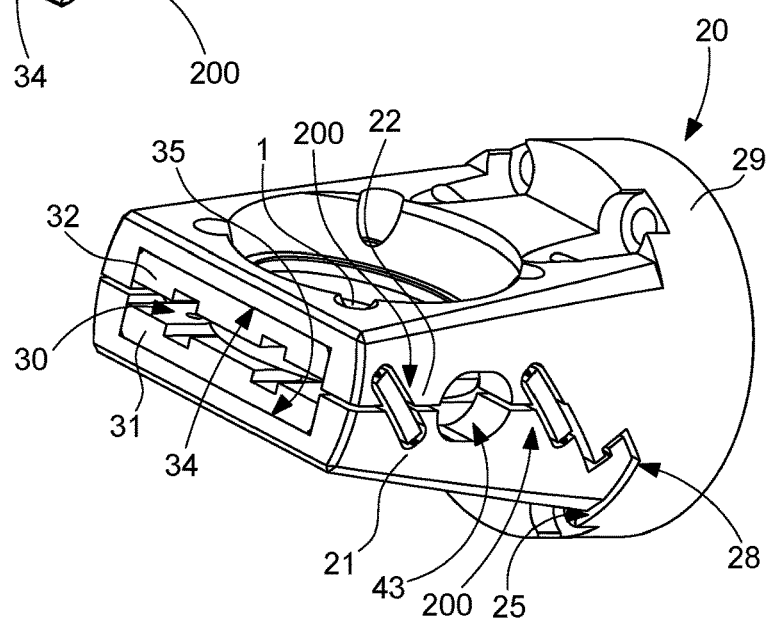
FIG. 4 represents, similarly to FIG. 3 and from another angle, the same fitting.
Figure 5:
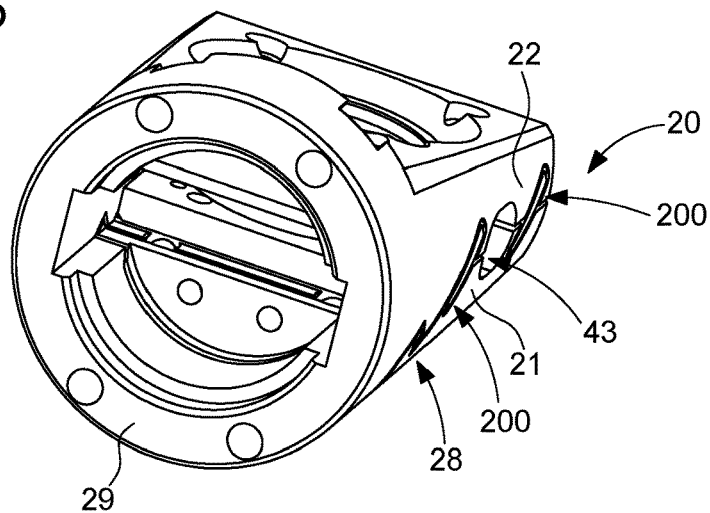
FIG. 5 represents, similarly to FIG. 3 and from yet another angle, the same fitting, on the side of the fastening sole that includes one of the jaws.

FIG. 3 illustrates such a one-piece fitting 20, which can be fastened directly on a pallet, on the axes of a machine tool, or the like.

More particularly, the manoeuvring means include flexible hinges 200 formed in the fitting 20, and which are arranged to, by elastic deformation, generate a relative movement between the jaws 21, 22. Herein the upper jaw 21 is only held to the lower jaw 22 by the flexible hinges 200 thereof, and a groove 25 separates it from the sole 29 that the lower jaw 22 includes, and which is used to fasten the fitting 20 on the machine.

More particularly still, each flexible hinge 200 includes a chamber 26, cut both in the upper jaw 21 and in the lower jaw 22, in which chamber 26 a lever mass 23, which is attached to each of the jaws 21, 22 by an elastic blade 24 or by a neck, is movable to form with the other flexible hinges 200 a parallel table, so as to monitor the relative parallel displacement of the reference surfaces 35 and 34.

This fitting 20 thus includes flexible hinges 200, which are cut in this part. These flexible hinges 200 are designed to, by elastic deformation, generate a relative movement between the upper portion and the lower portion of the tightening, which constitute the jaws 21 and 22. In this particular embodiment, each flexible hinge includes a chamber 26, cut to both in the upper jaw 21 and in the lower jaw 22, in which a lever mass 23, which is attached to each of the jaws 21 and 22 by an elastic blade 24, is movable; in a variant which is not illustrated, each elastic blade 24 can be replaced by a neck; this design explains the short travel of the jaws 21 and 22 relative to each other, but in return it guarantees a perfect repetitiveness of the kinematics, and a good resistance over time. This configuration is known as a "parallel table", also used in mechanical watch oscillators.

For the protection of the elastic blades 24, the fitting 20 advantageously includes at least one travel limiter device 28, represented by a capital S-shaped groove in the figures, and whose counteracting surfaces 281 and 282 cooperate in abutment support at the end of useful travel of the jaws 21 and 22, to avoid any dangerous deformation of the flexible hinges 200, and in particular of the elastic blades 24, outside their normal operating range. Thus, the force loop passes through the stops, and not the blades. It is understood that the technology of parallel tables with thin elastic blades, achievable by a "LIGA" or similar method, ensures a perfectly parallel movement, but over a very short travel, which is perfectly compatible with the tightening function provided by the fitting according to the invention. The safeties constituted by the travel limiter device 28, as well as by the faces of the groove 25 which constitute an additional safety support for the end-of-travel stop, are therefore essential for a good resistance over time and a repeatability of performance.

More particularly, one of the jaws 21, 22 is an upper jaw 21 moved by a driver 100 which is internal to the fitting 20 or external to the fitting 20, and which the manoeuvring means include, and the other of the jaws 21, 22, is a lower jaw 22 including a sole 29 arranged for fastening the fitting 20 to a device 300 for machining and/or assembly within production means 1000.

Figure 13:
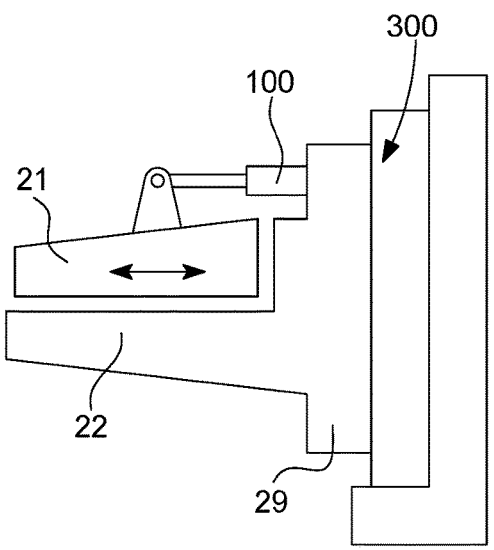
FIG. 13 represents, schematically, production means of including a machining and/or assembly device carrying such a fitting and such a driver to control a movement of the fitting between its open and closed positions; the driver is herein carried by one of the jaws.

In a first variant, the driver 100 is internal to the fitting 20 and fastened to the sole 29, as shown in FIG. 13.

Figure 14:
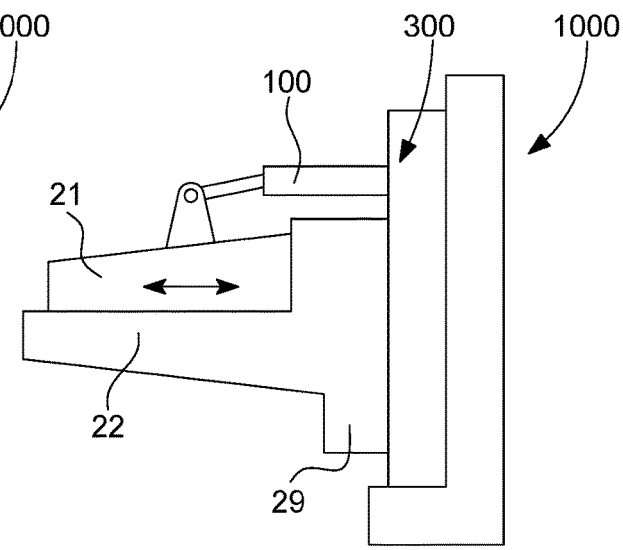
FIG. 14 represents, similarly to FIG. 13, such production means where the driver is carried by the machining and/or assembly device.

In a second variant, the driver is external to the fitting 20 and fastened to a machining and/or assembly device on which the fitting 20 is fastened, as shown in FIG. 14.

The upper jaw 21 can be actuated by a driver 100 such as a piston or the like.

In a variant, each lever 23 is oblique but not perpendicular to the reference plane PR.

In another variant, each lever 23 is oblique but passes through a perpendicular position relative to the reference plane PR, in its travel between its open position and its closed position.

The angle at rest of the levers 23 (not limited to the number of four in the figures) can be optimised according to the application. The closer the levers 23 are to the vertical (that is to say to the normal to the reference plane PR), the more an effect of amplification of the tightening force is obtained. Through a horizontal actuation (that is to say parallel to the reference plane PR), a vertical tightening force is obtained and a pinching of the component 1 to be machined between the upper jaw 21 and in the lower jaw 22 of the fitting 20.

Advantageously the fitting 20 comprises a one-piece assembly consisting of the jaws 21, 22 and the flexible hinges 200 which connect them to each other and which are arranged to, by elastic deformation under the action of a driver 100 on at least one of them, generate a relative tightening movement between the jaws 21, 22.

The invention also relates to production means 1000, including at least one machining and/or assembly device 300 carrying at least one such fitting 20 and at least one such driver 100, and including yet control means of each driver 100 to control a movement of the respective fitting 20 between its open and closed positions.

The invention is described herein in an application as a one-way clamping actuator. Naturally, it can also be used to constitute a two-way actuator. It should therefore be equipped with a force and travel limiter in each manoeuvring direction.

In short, the invention allows having an ultra-compact fitting allowing an easy access to all faces of the component 1, and thus a complete machining in a single tightening. Machining a part in a single clamping has very positive repercussions on the accuracy of the component 1, since this arrangement will not accumulate repositioning errors which are always present during a repeatedly machining.

The fitting according to the invention is simple, consisting of a one-piece part, very accurate, without clearance or hysteresis, with a perfectly linear behaviour. This fitting is still very rigid, because formed in one-piece. The fitting is, again, light, which enable its use for highly dynamic applications such as high speed turning or milling operations or other, requiring little energy or force to be displaced according to the movements of the machining machine.

Finally, the development of this fitting is advantageously dimensioned in order to be integrated into a multi-spindle machine.

The invention claimed is:

1. A fitting (20) for holding in a machining and/or assembly position a substantially flat component (1) with a thickness less than or equal to a predetermined maximum thickness (E) and extending on either side of a median plane (PM), comprising: stops (2; 3) defining at least two radial abutment support surfaces (S1; S2; S3) including generators which are substantially perpendicular to a reference plane (PR) of said fitting (20), relative to which reference plane (PR) said median plane (PM) of one said component (1) is parallel or coincident in said machining and/or assembly position, and which are arranged to cooperate in abutment support with peripheral edge support surfaces (11; 12; 13) of one said component (1); a chamber (40) which is bordered, on either side of said reference plane (PR), by jaws (21; 22) including clamping surfaces (310; 320) for holding one said component (1), said chamber (40) being open on at least one side by a recess (41; 42) capable of enabling the passage of a tool or another component or a machining and/or assembly means to perform an operation on one said component (1); and a single insertion orifice (30) configured to enable the insertion of one said component (1) into said chamber (40) towards said radial abutment support surfaces (S1; S2; S3) of said fitting (20); wherein said fitting (20) is deformable between an open position in which said insertion orifice (30) has a maximum opening of width equal to said predetermined maximum thickness (E), in the direction of the thickness of one said component (1) on either side of the said median plane (PM) thereof, and in which open position one said component (1) can be inserted into said chamber (40) to an abutment support position on said radial abutment support surfaces (S1; 22; S3), and a closed position around one said component (1) held supported on said radial abutment support surfaces (S1; S2; S3) and tightened by said jaws (21; 22) subjected to a closing force exerted by maneuvering means arranged to bring said jaws (21; 22) closer to each other and wherein said maneuvering means include flexible hinges (200) formed in said fitting (20), which are arranged to, by elastic deformation, generate a relative movement between said jaws (21, 22).

2. The fitting (20) according to claim 1, wherein at least one of said jaws (21; 22) includes friction means arranged to tend to drive pushing one said component (1) in abutment support on said radial abutment support surfaces (S1; S2; S3) during a closing manoeuvre.

3. The fitting (20) according to claim 1, wherein said chamber (40) is open, on each side of said reference plane (PR), by a recess (41; 42) enabling the double-sided access to one said component (1).

4. The fitting (20) according to claim 1, wherein said chamber (40) is open by at least one recess (43) enabling the lateral access to an edge of one said component (1).

5. The fitting (20) according to claim 1, wherein one of said jaws (21; 22) is an upper jaw (21) moved by a driver (100) which is internal to said fitting (20) or external to said fitting (20) and that said manoeuvring means include, and wherein the other of said jaws (21; 22) is a lower jaw (22) including a sole (29) arranged for fastening said fitting (20) to a machining and/or assembly device.

6. The fitting (20) according to claim 5, wherein said driver (100) is internal to said fitting (20) and fastened to said sole (29).

7. The fitting (20) according to claim 5, wherein said driver (100) is external to said fitting (20) and fastened to a machining and/or assembly device (300) on which said fitting is fastened (20).

8. The fitting (20) according to claim 1, wherein each of said flexible hinges (200) includes a chamber (26), cut both in said upper jaw (21) and in said lower jaw (22), in which chamber (26) a lever mass (23), which is attached to each of said jaws (21, 22) by an elastic blade (24) or by a neck, is movable to form with the other said flexible hinges (200) a parallel table.

9. The fitting (20) according to claim 8, wherein each said lever (23) is oblique but not perpendicular relative to said reference plane (PR).

10. The fitting (20) according to claim 8, wherein each said lever (23) is arranged to pass through a position perpendicular relative to said reference plane (PR), in its travel between its open position and its closed position.

11. The fitting (20) according to claim 1, wherein said fitting (20) includes at least one travel limiting device (28) including counteracting surfaces (281; 282) which are arranged to cooperate in abutment support at the end of useful travel of said jaws (21; 22), to avoid any dangerous deformation of said flexible hinges (200) outside their normal operating range.

12. The fitting (20) according to claim 11, wherein said fitting includes, between said jaws (21; 22) a groove (25) whose faces constitute an additional safety of end-of-travel abutment support.

13. The fitting (20) according to claim 1, wherein said clamping surfaces (310; 320) form part of said jaws (21; 22).

14. The fitting (20) according to claim 1, wherein said clamping surfaces (310; 320) form part of removable inserts (31; 32) housed in said jaws (21; 22), and which together define said insertion orifice (30).

15. The fitting (20) according to claim 14, wherein said fitting (20) includes a one-piece assembly consisting of said jaws (21; 22) and flexible hinges (200) which connect them to each other and which are arranged to, by elastic deformation under the action of a driver (100) on one of them, generate a relative tightening movement between said jaws (21, 22).

16. A production device, comprising at least one machining and/or assembly device (300) carrying at least one fitting (20) for holding in a machining and/or assembly position a substantially flat component (1) with a thickness less than or equal to a predetermined maximum thickness (E) and extending on either side of a median plane (PM), wherein said fitting (20) comprises: stops (2; 3) defining at least two radial abutment support surfaces (S1; S2; S3) including generators which are substantially perpendicular to a reference plane (PR) of said fitting (20), relative to which reference plane (PR) said median plane (PM) of one said component (1) is parallel or coincident in said machining and/or assembly position, and which are arranged to cooperate in abutment support with peripheral edge support surfaces (11; 12; 13) of one said component (1), a chamber (40) which is bordered, on either side of said reference plane (PR), by jaws (21; 22) including clamping surfaces (310; 320) for holding one said component (1), said chamber (40) being open on at least one side by a recess (41; 42) capable of enabling the passage of a tool or another component or a machining and/or assembly means to perform an operation on one said component (1), and a single insertion orifice (30) configured to enable the insertion of one said component (1) into said chamber (40) towards said radial abutment support surfaces (S1; $2; 83) of said fitting (20), wherein said fitting (20) is deformable between an open position in which said insertion orifice (30) has a maximum opening of width equal to said predetermined maximum thickness (E), in the direction of the thickness of one said component (1) on either side of the said median plan (PM) thereof, and in which open position one said component (1) can be inserted into said chamber (40) to an abutment support position on said radial abutment support surfaces (S1; 82; S3), and a closed position around one said component (1) held supported on said radial abutment support surfaces (S1; S2; S3) and tightened by said jaws (21; 22) subjected to a closing force exerted by maneuvering means arranged to bring said jaws (21; 22) closer to each other, wherein one of said jaws (21; 22) is an upper jaw (21) moved by a driver (100) which is internal to said fitting (20) or external to said fitting (20) and that said maneuvering means include, and wherein the other of said jaws (21; 22) is a lower jaw (22) including a sole (29) arranged for fastening said fitting (20) to a machining and/or assembly device, wherein said maneuvering means include flexible hinges (200) formed in said fitting (20), which are arranged to, by elastic deformation, generate a relative movement between said jaws (21, 22), and wherein the production device further comprises: at least one driver (100), and means for controlling each said driver (100) to control a movement of said respective fitting (20) between its open and closed positions.

17. A fitting (20) for holding in a machining and/or assembly position a substantially flat component (1) with a thickness less than or equal to a predetermined maximum thickness (E) and extending on either side of a median plane (PM), comprising: stops (2; 3) defining at least two radial abutment support surfaces (S1; S2; S3) including generators which are substantially perpendicular to a reference plane (PR) of said fitting (20), relative to which reference plane (PR) said median plane (PM) of one said component (1) is parallel or coincident in said machining and/or assembly position, and which are arranged to cooperate in abutment support with peripheral edge support surfaces (11; 12; 13) of one said component (1); a chamber (40) which is bordered, on either side of said reference plane (PR), by jaws (21; 22) including clamping surfaces (310; 320) for holding one said component (1), said chamber (40) being open on at least one side by a recess (41; 42) capable of enabling the passage of a tool or another component or a machining and/or assembly means to perform an operation on one said component (1); and a single insertion orifice (30) configured to enable the insertion of one said component (1) into said chamber (40) towards said radial abutment support surfaces (S1; S2; $3) of said fitting (20); said fitting (20) is deformable between an open position in which said insertion orifice (30) has a maximum opening of width equal to said predetermined maximum thickness (E), in the direction of the thickness of one said component (1) on either side of the said median plane (PM) thereof, and in which open position one said component (1) can be inserted into said chamber (40) to an abutment support position on said radial abutment support surfaces (S1; 82; S3), and a closed position around one said component (1) held supported on said radial abutment support surfaces (S1; S2; S3) and tightened by said jaws (21; 22) subjected to a closing force exerted by maneuvering means arranged to bring said jaws (21; 22) closer to each other, and wherein at least one of said jaws (21; 22) includes friction means arranged to tend to drive pushing one said component (1) in abutment support on said radial abutment support surfaces (S1; S2; $3) during a closing manoeuvre maneuver.

18. A production device, comprising at least one machining and/or assembly device (300) carrying at least one fitting (20) for holding in a machining and/or assembly position a substantially flat component (1) with a thickness less than or equal to a predetermined maximum thickness (E) and extending on either side of a median plane (PM), wherein said fitting (20) comprises: stops (2; 3) defining at least two radial abutment support surfaces (S1; S2; S3) including generators which are substantially perpendicular to a reference plane (PR) of said fitting (20), relative to which reference plane (PR) said median plane (PM) of one said component (1) is parallel or coincident in said machining and/or assembly position, and which are arranged to cooperate in abutment support with peripheral edge support surfaces (11; 12; 13) of one said component (1), a chamber (40) which is bordered, on either side of said reference plane (PR), by jaws (21; 22) including clamping surfaces (310; 320) for holding one said component (1), said chamber (40) being open on at least one side by a recess (41; 42) capable of enabling the passage of a tool or another component or a machining and/or assembly means to perform an operation on one said component (1), and a single insertion orifice (30) configured to enable the insertion of one said component (1) into said chamber (40) towards said radial abutment support surfaces (S1; S2; $3) of said fitting (20), wherein said fitting (20) is deformable between an open position in which said insertion orifice (30) has a maximum opening of width equal to said predetermined maximum thickness (E), in the direction of the thickness of one said component (1) on either side of the said median plane (PM) thereof, and in which open position one said component (1) can be inserted into said chamber (40) to an abutment support position on said radial abutment support surfaces (S1; 82; S3), and a closed position around one said component (1) held supported on said radial abutment support surfaces (S1; S2; S3) and tightened by said jaws (21; 22) subjected to a closing force exerted by maneuvering means arranged to bring said jaws (21; 22) closer to each other, wherein one of said jaws (21; 22) is an upperjaw (21) moved by a driver (100) which is internal to said fitting (20) or external to said fitting (20) and that said maneuvering means include, and wherein the other of said jaws (21; 22) is a lower jaw (22) including a sole (29) arranged for fastening said fitting (20) to a machining and/or assembly device, wherein at least one of said jaws (21; 22) includes friction means arranged to tend to drive pushing one said component (1) in abutment support on said radial abutment support surfaces (S1; S2; $3) during a closing maneuver, and wherein the production device further comprises: at least one said driver (100), and means for controlling each said driver (100) to control a movement of said respective fitting (20) between its open and closed positions.

\* \* \* \* \*